United States Patent [19]

Uhlmann et al.

[11] 4,012,232

[45] Mar. 15, 1977

[54] STABILIZED PHOTOCHROMIC MATERIALS

[75] Inventors: Donald R. Uhlmann, Newton; Elias Snitzer, Wellesley; Richard J. Hovey, Sturbridge; Nori Y.C. Chu, Southbridge, all of Mass. and Joseph I. Fournier, Jr., Storrs, Conn.

[73] Assignee: Nori Y. C. Chu, Southbridge, Mass.

[22] Filed: Dec. 23, 1974

[21] Appl. No.: 535,452

[52] U.S. Cl. .................. 106/308 B; 106/DIG. 6; 350/160 P

[51] Int. Cl.$^2$ ........................................ G02B 5/23

[58] Field of Search .............. 106/308 B, DIG. 6; 96/90 PC; 350/160 P

[56] References Cited

UNITED STATES PATENTS 3,810,763   5/1974   Laridon et al. ................ 96/90 PC

*Primary Examiner*—Patrick P. Garvin
*Assistant Examiner*—J. V. Howard
*Attorney, Agent, or Firm*—Kenway & Jenney

[57] ABSTRACT

Organic photochromic materials comprise a photochromic pigment stabilized with a protective inorganic coating which serves to protect the pigments from deactivation by exposure to moisture, oxygen, various plastic host materials, reactive chemicals or even normal atmospheric conditions. Useful organic photochromic pigments include the anils, hydrazones, semicarbozones, osazones, sydnones, fulgides and others. Inorganic coatings comprising such materials as zinc oxide, titanium dioxide, aluminum oxide, antimony oxide and silicon dioxide are useful in the preparation of photochromic plastic films, sheets, ophthalmic lenses such as lenses for sunglasses and in camera lenses and filters.

18 Claims, No Drawings

STABILIZED PHOTOCHROMIC MATERIALS

BACKGROUND OF THE INVENTION

1. Field of the Invention

The instant invention is in the field of photochromic compositions. It is more particularly directed to particulate photochromic materials comprising organic photochromic pigments coated with inorganic materials.

2. Prior Art

It is known to combine a photochromic material and a resinous material, for instance, U.S. Pat. No. 3,761,422 relates to the preparation of a photochromic plastisol composition containing metal complexes of diphenylthiocarbazone which can be formed into a film. U.S. Pat. No. 3,565,814 relates to a photochromic composition having a fast rate of color change comprising a polymer of lauryl methacrylate having dispersed throughout the body thereof various benzospiropyran compounds. U.S. Pat. No. 3,666,352 relates to a photochromic lens comprising a sheet of vinyl chloridevinyl acetate copolymer containing a mercury dithiozonate compound laminated between glass or plastic layers.

The need for protection of photochromic materials against atmospheric oxygen has also been recognized by the prior art as a means of insuring fast action and longer reversibility, for instance, U.S. Pat. No. 3,716,489 discloses a method of producing a fast-acting photochromic filter in which the photochromic material is in the form of a solid solution in a solid optically transparent epoxy polymer or alternately a polycarbonate polymer matrix.

In British Pat. No. 1,191,483 there is disclosed that a chromotropic dye can be sorbed into silica gel. Diphenyl thiocarbazones can be sorbed first and then reacted with desired metal cations to produce a useful chromotropic colorant composition or the metal salt absorbed directly.

SUMMARY OF THE INVENTION

It is an object of the invention to provide an encapsulated photochromic particulate material comprising a photochromic pigment protected by an inorganic material present, for instance, as an outer shell of a particulate photochromic material particle. In such form, the particulate material can be easily introduced into various plastic materials useful in the preparation of ophthalmic and other optical devices to provide a photochromic system having phototropic characteristics comprising more efficient and longer lasting reversible change in color to provide varying degrees of light transmission as a result of exposure to light.

It is a further object of the invention to provide a method of forming said encapsulated photochromic particulate material having an inorganic outer coating which protects the photochromic material from adverse effects such as the effects of monomers, catalysts and other reactive additives used in the formation of synthetic plastic materials, oxygen, moisture or changes in atmospheric conditions.

The invention comprises a coated photochromic particle the dimensions of which are about 30 A to about 1 μ. A protective coating of an inorganic material is utilized on the surface of the photochromic particle. The coating thickness is any effective thickness suitable to prevent diffusion from within the coating and to prevent absorption through the coating by the photochromic material of reactive chemicals, oxygen, moisture and other atmospheric contaminants which would reduce the fast-acting and reversible properties of the photochromic material. Desirable coating materials for protection of the photochromic material particle consist of inorganic glasses, inorganic oxides and non-oxide materials. Particularly preferred coating materials are such inorganic materials as zinc oxide, titanium dioxide, aluminum oxide, antimony oxide and silicon dioxide.

DESCRIPTION OF THE PREFERRED EMBODIMENTS

The process of the invention relates to the use of any photochromic material particle which is suitable for encapsulation with a protective inorganic thin film by procedures such as any of the following:

The photochromic pigment is dissolved in a suitable solvent. Upon evaporation of solvent from particles obtained by spraying the solution crystals are obtained of appropriate dimension. Should further reduction in the size of the particles be required, this is accomplished by the use of conventional attrition, colloid or fluid energy mills. Alternatively, a film cast from a solvent solution can be comminuted using conventional attrition colloid or fluid energy mills to produce crystals of appropriate size.

The photochromic material particles of the invention comprise an organic photochromic pigment in crystalline form and an inorganic protective material. Examples of pigments which exhibit photochromism in the crystalline form are the anils, hydrazones, semicarbazones, osazones, sydnones and fulgides. This listing is not intended to be limiting as the scope of the invention broadly includes any photochromic pigment that exhibits photochromism in the crystalline state.

The anils are condensation products of an aromatic amine and an aromatic aldehyde (almost exclusively salicylaldehyde or one of its derivatives). Photochromic anils have been formed by condensation of salicylaldehyde and the following aromatic amines:

1. m-aminobenzoic acid,
2. p-aminobenzoic acid,
3. o-aminocinnamic acid,
4. p-aminoethylbenzoate,
5. aniline,
6. o-anisidine,
7. p-anisidine,
8. m-bromo-aniline,
9. o-bromoaniline,
10. p-bromoaniline,
11. o-chloroaniline,
12. B-naphthylamine,
13. m-phenylenediamine,
14. m-toluidine,
15. p-toluidene and
16. 1,3,4-xylidene;

the condensation products of 5-bromosalicylaldehyde with:

1. p-bromvaniline and
2. α-naphthylamine;

the condensation products of o-nitrobenzaldehyde with:

1. p-aminobiphenyl,
2. o-anisiline,
3. α-naphthylamine,
4. m-nitroaniline,
5. o-nitroaniline,
6. p-nitroaniline and
7. p-phenetidine.

The hydrazones are condensation products of various hydrazines with various aldehydes, esters, ketones and α-diketones. Photochromic hydrazones have been formed by the condensation of anisylhydrazine with:
1. benzaldehyde,
2. cinnamaldehyde and
3. cuminaldehyde;

by the condensation of p-bromophenylhydrazine with:
1. benzaldehyde,
2. cinnamaldehyde,
3. cuminaldehyde, and
4. salicylaldehyde;

by the condensation of m-chlorophenylhydrazine with:
1. anisylaldehyde,
2. cinnamaldehyde,
3. cuminaldehyde,
4. piperonal and
5. p-tolualdehyde;

by the condensation of p-chlorophenylhydrazine with:
1. benzaldehyde,
2. cinnamaldehyde,
3. cuminaldehyde, and
4. p-tolualdehyde;

by the condensation of B-naphthylhydrazine with:
1. o-aminobenzaldehyde,
2. benzaldehyde,
3. cinnamaldehyde,
4. cuminaldehyde,
5. 2,4-dihydroxybenzaldehyde,
6. p-dimethylaminobenzaldehyde,
7. 2-furaldehyde,
8. m-hydroxybenzaldehyde,
9. p-hydroxybenzaldehyde,
10. m-methoxybenzaldehyde,
11. o-methoxybenzaldehyde,
12. piperanol,
13. m-tolualdehyde,
14. o-tolualdehyde,
15. p-tolualdehyde,
16. vanillin and
17. veratraldehyde;

by the condensation of phenylhydrazine with:
1. anisaldehyde,
2. benzaldehyde,
3. 5-bromosalicylaldehyde,
4. cinnamaldehyde,
5. p-n-decyloxybenzaldehyde,
6. diethyl dimethyloxalacetate,
7. p-n-nonoxybenzaldehyde,
8. 1-phenyl-1-hexen-3-one,
9. 1-phenyl-1-pentene-3-one and
10. p-tolualdehyde;

by the condensation of m-tolylhydrazine with:
1. benzaldehyde,
2. cinnamaldehyde,
3. cuminaldehyde, and
4. piperanol;

by the condensation of p-tolylhydrazine with:
1. benzaldehyde,
2. cinnamaldehyde,
3. cuminaldehyde,
4. 2-furaldehyde and
5. piperanol;

by the condensation of 1,3,4-xylylhydrazine with:
1. anisaldehyde,
2. benzaldehyde,
3. cuminaldehyde,
4. piperanol,
5. salicylaldehyde and
6. p-tolualdehyde;

and by the condensation of 1,3,5, xylylhydrazine with cinnamaldehyde.

Semicarbazones are condensation products of various semicarbazides with aldehydes or ketones. Photochromic semicarbazones have been formed by the condensation of semicarbazide with:
1. 5-methyl-1-(3,4-methylenedioxyphenyl)-1-hexen-3-one,
2. 5-methyl-1-(1-naphthyl)-1-hexen-3-one,
3. p-methoxycinnamaldehyde,
4. 1-(4-methoxyphenyl)-5-methyl-1-hexen-3-one,
5. 5-(4-methoxyphenyl)-2-penten-3-one,
6. 6-(4-methoxyphenyl)-2-methyl-5-hexen-4-one,
7. 1-(1-naphthyl)-1-hexen-3-one,
8. 2-nitrochalcone,
9. 3-nitrochalcone,
10. 1-phenyl-1-hepten-3-one,
11. 1-phenyl-1-penten-3-one and
12. 5-phenyl-4-penten-3-one;

by the condensation of thiosemicarbazide with:
1. cinnamaldehyde,
2. 4-(4-hydroxyphenyl)-3-buten-2-one,
3. 1-(4-isopropyl-phenyl)-1-hexen-3-one,
4. 1-(4-isopropyl-phenyl)-1-penten-3-one,
5. 4-methyl-1-(3,4-methylenedioxyphenyl)-1-penten-3-one,
6. 1-(3,4-methylenedioxyphenyl)-1-penten-3-one,
7. o-methoxycinnamaldehyde,
8. 1-(2-methoxyphenyl)-4-methyl-1-penten-3-one,
9. 4-(2-methoxyphenyl)-3-methyl-3-buten-2-one,
10. 4-(4-methoxyphenyl)-3-ethyl-3-buten-2-one, and
11. 4-phenyl-3-buten-2-one;

by the condensation of phenylsemicarbazide with:
1. 1-(2-hydroxyphenyl)-1-penten-3-one,
2. 4-(4-hydroxyphenyl)-3-buten-2-one,
3. 1-(4-isopropylphenyl)-1-hexen-3-one,
4. 1-(4-isopropylphenyl)-1-penten-3-one,
5. 4-methyl-1-(3,4-methylenedioxyphenyl)-1-penten-3-one,
6. 5-methyl-1-(3,4-methylenedioxyphenyl)-1-hexen-3-one,
7. 1-(3,4-methylenedioxyphenyl)-1-penten-3-one,
8. 4-(4-methoxyphenyl)-3-ethyl-3-buten-2-one, and
9. 4-phenyl-3-buten-2-one.

The osazones are condensation products of a hydrazine with a dicarbonyl compound. Photochromic osazones have been formed by the condensation of α-naphylhydrazine with:
1. anisil aldehyde, and
2. piperil aldehyde;

by the condensation of phenylhydrazine with:
1. anisil aldehyde,
2. benzil aldehyde,
3. cuminaldehyde and
4. piperil aldehyde;

by the condensation of m-tolyl-hydrazine with:
1. anisil aldehyde,
2. benzil aldehyde and
3. piperilaldehyde;

by the condensation of o-tolyl-hydrazine with:
1. benzil aldehyde and
2. piperil aldehyde;

by the condensation of p-tolylhydrazine with:
1. anisil aldehyde,
2. benzil aldehyde and
3. piperil aldehyde; and by the condensation of 1,3,4-xylylhydrazine with:
1. anisil aldehyde,
2. benzil aldehyde and
3. piperil aldehyde.

The sydnones are essentially white crystalline materials which turn to a deep blue in sunlight. Recovery times are in order of hours. As examples of useful sydnones the following may be listed:
N-benzylsydnone,
N-p-methylbenzylsydnone,
N-3-,4-dimethylbenzylsydnone,
N-p-chlorobenzyl sydnone,
N,N'-ethylene-bis-sydnone,
N,N'-tetramethylene-bis-sydnone and
N-3-pyridylsydnone.

The fulgides are derivatives of dimethylene succinic anhydride. Unactivated they are light yellow but turn red or red-orange upon light activation. Useful members in this series includes:
1. $\alpha,\alpha',\delta'$-triphenylfulgide,
2. $\alpha,\alpha'$-diphenylfulgide,
3. $\delta$-o-methoxyphenylfulgide and
4. $\alpha,\alpha'$-diphenyl-$\delta'$-p-methoxyphenylfulgide.

In producing the photochromic materials of the invention, the photochromic pigments are first obtained in the crystalline form. As previously described, a method of obtaining crystals is by the evaporation of solvent from particles consisting of a photochromic pigment dissolved in a solvent, such particles being obtained by spraying the solution into a suitable collection chamber as further described below or by comminuting a film obtained by evaporation of solvent. A colloid or attrition mill can be used to further reduce the particle size, if required, to the desired size range of about 30 A to about 1$\mu$.

The processes utilized for encapsulating the photochromic pigments of the invention with an inorganic protective material such as silicon dioxide, titanium dioxide, aluminum oxide, antimony oxide, zinc oxide and inorganic glasses and mixtures thereof include the following:

1. A titanium salt such as titanium chloride or other inorganic material is precipitated onto the surface of the photochromic pigment particle obtained as previously described within the range of about 30 A to about 1$\mu$. Precipitation can take place in an aqueous medium in which the photochromic pigment particle is dispersed and the titanium salt is dissolved. Subsequently, the titanium salt or other coating material is precipitated onto the photochromic particle by evaporation of solvent or by reducing the solubility by temperature change or by chemical methods such as addition of a base or other anion that would cause precipitation of titanium salt. The coated particles are isolated and the titanium salt is changed to an oxide, if required, by the application of heat. Precipitation of such materials as titanium dioxide onto the surface of pigment particles is well-known in the art of preparing pigments for use in paint and other coatings. For instance, a titanium-calcium pigment is produced by precipitating titanium dioxide on the surface of calcium sulfate particles to produce a pigment having 30 to 50% titanium dioxide content. The titanium-calcium pigment, when so protected by a titanium dioxide surface coating, permits the use of calcium sulfate in water base paints which would not be possible otherwise since because of the partial solubility of calcium sulfate in water, the calcium ions present can react with materials present in water base paint such as proteinaceous materials as exemplified by casein. In a similar manner, therefore, it is possible to protect the photochromic pigment by a coating, for instance, of titanium dioxide and thereby prevent for instance the adverse effects of oxygen or water vapor on the photochromic materials when subsequently dispersed with a plastic material and utilized in an ophthalmic or optical device.

2. As a second means of providing an inorganic material coating on a photochromic pigment particle, the photochromic pigment in crystalline form is first produced in a suitable finely divided crystalline form by methods known in the art of producing pigment materials such as by use of a colloid mill, fluid energy mill, etc. to produce particles ranging in size between about 30 A to about 1$\mu$. Such particles are then added to a solution of an inorganic material. For instance, titanium dioxide is soluble in hot concentrated sulfuric acid as $TiOSO_4$. The inorganic material is then precipitated from the solution as, for example, by adjustment of pH and hydrolysis to form $TiO_2$ from $TiOSO_4$. The coating process should be effected as rapidly as possible to avoid decomposition of the photochromic pigment particularly by hydrolysis.

3. The crystalline photochromic pigment can be provided with a protective inorganic layer by suspension in an aqueous solution of hydrolyzed tetra-ethylorthosilicate. Upon evaporation of the water, and subsequent heating of the remaining particles, individually coated particles are obtained with a transparent layer of silicon dioxide.

4. As a further method of obtaining an encapsulated photochromic material particle, known vapor phase coating techniques are useful. For instance, oxide films can be produced by cathodic sputtering of a metal in an oxygen atmosphere, sulfide films by cathodic sputtering in hydrogen sulfide, nitride films by sputtering in nitrogen etc. The molecules of the reactive gas are activated in such process in the electric discharge so that chemical reaction can take place with the metal to produce the film of metallic compound. It should be noted that the use of the term "metal" used to refer to the inorganic material protective coating includes metalloids such as silicon, germanium, boron and phosphorous which, although in the true sense are nonmetals. These metalloids in many ways act and react like metals and are useful in forming a protective coating for the photochromic material. By such a process, films of silicon dioxide, titanium dioxide, aluminum oxide, antimony oxide, zinc oxide, inorganic glasses and mixtures thereof can be produced on the surface of photochromic material particles. Alternatively, the coating compounds can be applied by vacuum evaporation, nonreactive sputtering, or chemical vapor deposition techniques.

During the coating process, the photochromic material particle is kept in a state of suitable agitation, for example, by mechanical means so as to provide a substantially even coating on the surface of the photochromic particle.

The photochromic material particles coated with an inorganic material can be dispersed in a plastic host by various methods depending upon the material utilized as the host. For instance, where an allyl diglycol carbonate, for instance, the material sold under the trademark "CR 39" is utilized, the particles are dispersed in the monomer in combination with a suitable amount of catalyst and the mixture cast in a lensshaped mold according to conventional techniques as disclosed in U.S. Pat. Nos. 3,278,654; 3,469,928; 3,211,811; 2,964,501; and 3,605,195; the collective disclosures of the patents are hereby incorporated by reference. The particles can be dispersed in other monomers and polymerization effected, for instance, using conventional bulk, solution, emulsion and suspension polymerization processes.

The coated photochromic materials also can be incorporated in thermoplastic resins exemplified by such resins as polymethylmethacrylate, cellulose acetate butyrate, cellulose triacetate and polycarbonates such as those sold under the trademark "Lexan", a poly(4-,4'-dioxydiphenol-2,2-propane) carbonate. The encapsulated photochromic material particles are mixed, for instance, with a powdered form of polycarbonate resin and the mixture subsequently injection molded to produce an ophthalmic lens or optical device. Films also can be prepared by casting from solution a mixture of the encapsulated photochromic material particles and a solution of a thermoplastic resin in a suitable solvent, for example, polymethylmethacrylate dissolved in toluene.

The proportion of encapsulated photochromic material of the invention utilized in combination with a plastic host material in the preparation of ophthalmic or optical devices is between about 0.01 to about 80 weight percent preferably about 0.05 to about 80 weight percent and depends necessarily upon the photochromic properties of the encapsulated photochromic material particle selected and the required optical density. Lenses and optical devices prepared according to the foregoing lens casting procedures can be ground, polished and glazed in conventional manner using conventional techniques without affecting adversely the photochromic reactivity of the encapsulated photochromic pigment particle dispersed therein.

As will be apparent, the encapsulation of the photochromic pigment particles can be less than 100% complete and yet provide substantial improvement over the unencapsulated photochromic material when incorporated in a plastic host material. The important criterion is that, as a whole, the particles of the photochromic pigment are coated to render them sufficiently resistant to the effects of oxygen, moisture or the effects of catalysts, or other deleterious chemicals in the composition that would inhibit the functioning of the photochromic material. The novel photochromic pigment particles coated with an inorganic protective material can be used to produce ophthalmic and optical devices, such articles as plastic window panes, sky lights, automobile windshields, camera filters, wall panels, jewelry, toys, advertising articles and the like.

It will be recognized by those skilled in the art that the particle size distribution of the coated photochromic material particles utilized in a transparent article such as a lens is relatively narrow and small in size as compared to the particle size distribution of coated particles utilized in a translucent or reflective article such as a wall panel.

EXAMPLE 1

20 Grams of the photochromic pigment salicylidene aniline is dissolved in 200 ml of methyl alcohol. The solvent is rapidly evaporated by pouring the solution onto a shallow preheated tray heated to 50° C. The photochromic pigment under these conditions is crystallized rapidly in the form of very fine light-yellow colored crystals which are further reduced in size by passing them through a fluid energy mill.

At ordinary operating temperatures this particular material exhibits its photochromism only in the crystalline state. In this example, the photochromic crystals which are reduced to an appropriate size are provided with a transparent coating by sputtering with a silicate.

1 Gram of the crystals so coated is dispersed in 100 grams of partially polymerized styrene. The coating solution is poured into rectangular molds and the polymerization completed. The ⅛ inch thick plates so obtained are yellow in color and change to an orange-red shade when exposed to ultraviolet light. In the absence of light, they will return to their original yellow color at 70° F in approximately 20 minutes. However, almost instantaneous return to the original color may be achieved upon exposure to white light such as that obtained from a tungsten lamp.

EXAMPLE 2

5 Grams of N-(3-pyridyl)-sydnone are dissolved in 200 ml of methanol. Rapid evaporation of the solvent as in Example 1 yields a very fine white crystalline material. The crystalline material is further reduced in size by processing with an attrition mill.

The resulting crystalline particles are provided with a transparent protective coating by sputtering with aluminum in an oxygen atmosphere. Thus each small crystalline particle is provided with a coating of $Al_2O_3$.

0.5 Gram of the coated crystalline particles described above is suspended in 100 ml of a 20% solution of polymethylmethacrylate in toluene and a film cast on a 3 mil thick Mylar support. After evaporation of the solvent, a photochromic film is obtained which is colorless but which changes to a dark blue upon exposure to bright sunlight. In the dark the film returns to its original colorless state.

EXAMPLE 3

20.0 Grams of $\alpha,\alpha';\delta'$-triphenylfulgide are dissolved in 500 ml of tetrahydrofuran. This solution is then sprayed under pressure through a fine nozzle into a collection chamber provided with filtered inlet and outlet tubes for the introduction of a stream of clean air to facilitate the evaporation of the solvent.

Approximately 20 grams of the extremely fine crystalline fulgide are collected from the evaporation chamber and suspended in 200 ml of a 3% aqueous solution of tetraethylorthosilicate and 8 grams of sulfuric acid. Satisfactory suspension of the particles is provided by rapid stirring with a magnetic stirrer. The solvent is driven off by gentle heating under vacuum. The particles are collected and subsequently heated to produce photochromic crystalline particles individually coated with a thin transparent layer of silicon dioxide.

The particles prepared in the above manner in the amount of 0.5 grams are dispersed in 95 grams of allyl diglycol carbonate prepolymer containing 5 grams of iso-propyl peroxide. The prepolymer mixture is then injected into glass lens forming molds. After polymerization and curing in a conventional manner, the plastic lenses are removed from the molds. The lenses thus formed are yellow in color and turn a deep orange-red color upon exposure to bright sunlight and return to their original yellow color when stored in the dark.

EXAMPLE 4

Benzaldehyde phenylhydrazone is dissolved in boiling ethyl alcohol until a saturated solution is obtained. The solution is rapidly filtered with suction through a heated funnel into a heated flask. The warm solution is then immediately immersed in an acetone-dry ice mixture to induce rapid crystallization of the photochromic material in crystalline form. The crystalline particles are separated by filtration and air-dried. To further reduce the size of the crystalline photochromic material they are processed in a colloid mill in the usual manner.

Approximately 10 grams of the extremely fine crystalline powder are suspended in 500 ml of an aqueous solution containing 30 grams of titanyl sulfate. To this aqueous suspension are then added 100 ml of a 20% solution of sodium hydroxide. Titanium hydroxide first forms and coats the particles and later becomes titanium dioxide after separation of the suspension according to the following reaction:

$$2 Ti(OH)_3 \rightarrow 2TiO_2 + 2H_2O + H_2$$

2.0 Grams of the coated crystalline particles are suspended in 100 grams of methylmethacrylate monomer containing 0.5% by weight of benzoyl peroxide. The prepolymer mix containing the coated, suspended particles is cast in rectangular glass molds which after polymerization yield flat photochromic plates ⅛ inch thick. When activated with ultraviolet or blue light these plates change from a light amber color to a darker amber-red. Recovery occurs after storage in the dark for several days.

EXAMPLE 5

10 Grams of the semicarbazone of cinnamaldehyde are dissolved in 60 ml of warm ethyl alcohol. This solution is then added with rapid stirring to approximately 1 liter of an ice-water mixture. The finely divided crystals which form immediately are separated and air-dried. The finely divided crystalline particles are then provided with a protective silicate coating as in Example 1.

3.0 Grams of the coated particles are intimately mixed with 87 grams of cellulose acetate butyrate and 10 grams of dioctyl phthalate. Using the above coated particles, wall panels are cast. The panels are essentially colorless before activation but turn a dark yellow color when activated. In the absence of activating light, the panels return to their original colorless state in approximately 3 hours.

Various additional changes and modifications from the embodiments herein shown can be made by those skilled in the art without departing from the invention. Therefore, it is intended that the invention not be limited thereby.

We claim:

1. A stabilized photochromic particle for incorporation into a plastic host to impart photochromic properties thereto, said particle comprising an organic photochromic pigment crystal having a diameter in the range of 30 A to 1 micron, said photochromic crystal having a protective coating on substantially the entire surface thereof effective to render the photochromic, crystal impervious to the effects of oxygen, moisture, monomers, catalysts, and other chemicals used in the formation of the plastic host which are deleterious to said crystal.

2. A photochromic particle according to claim 1 wherein said particle is coated with an inorganic oxide material selected from the group consisting of silicon dioxide, titanium dioxide, aluminum oxide, antimony oxide, zinc oxide, inorganic glasses and mixtures thereof.

3. A photochromic particle according to claim 2 wherein said pigment is selected from the group consisting of anils, hydrazones, semicarbazones, osazones, sydnones and fulgides.

4. A material which exhibits photochromic properties comprising a plastic host having a plurality of photochromic particles incorporated therein, each of said photochromic particles comprising:

an organic photochromic pigment crystal having a diameter in the range of 30 Angstroms to 1 micron; and a protective coating on substantially the entire surface of said photochromic crystal effective to render the photochromic crystal impervious to the effects of oxygen, moisture, monomers, catalysts, and other chemicals used in the formation of the plastic host which are deleterious to said crystal;

the coatings on said crystals enabling the crystals to impart photochromic properties to said plastic hosts when incorporated therein.

5. The material as set forth in claim 4 wherein the proportion of said material is 0.01 to 80 weight percent coated photochromic particles and wherein said plastic host comprises a substance selected from the group consisting of poly(allyl diglycol carbonate), polycarbonate, polymethylmethacrylate, cellulose acetate butyrate, and cellulose triacetate.

6. The photochromic material of claim 4 wherein each said photochromic particle is coated with an inorganic oxide material selected from the group consisting of silicon dioxide, titanium dioxide, aluminum oxide, antimony oxide, zinc oxide, inorganic glasses, and mixtures thereof.

7. A photochromic material of claim 5 wherein said pigment is selected from the group consisting of anils, hydrazones, semicarbazones, osazones, sydnones, and fulgides.

8. A process for producing a stabilized photochromic particle suitable for incorporation into a plastic host for imparting photochromic properties thereto, said process comprising:

1. forming an organic photochromic pigment crystal having a diameter in the range of about 30 A to about 1 micron; and, 2. depositing a thickness of an inorganic protective coating on substantially the entire surface of said crystal to render said photochromic particle impervious to the effects of oxygen, moisture, monomers, catalysts, and other chemicals used in the formation of synthetic plastic hosts which are deleterious to said crystal.

9. The process of claim 8 wherein said forming step (1) is effected by:

a. forming a solution of an organic photochromic pigment;

b. forming crystals of said pigment by evaporating the solvent from said solution; and c. reducing the size of said crystals to between 30 A and 1 micron.

10. The process as set forth in claim 9 wherein said crystal is reduced in size by comminuting said crystals by using a mill.

11. The process as set forth in claim 9 wherein said crystal is reduced in size by comminuting said crystals by using a fluid energy mill.

12. The process as set forth in claim 10 wherein said crystal is comminuted by using a colloid mill.

13. The process as set forth in claim 10 wherein said crystal is reduced in size by being comminuted in an attrition mill.

14. The process as set forth in claim 8 wherein said inorganic protective coating is deposited on said photochromic pigment particle by cathodic sputtering with a metal.

15. The process as set forth in claim 8 wherein said protective coating is deposited on said photochromic pigment by vacuum deposition.

16. The process as set forth in claim 8 wherein said inorganic coating is deposited on said photochromic pigment particle by chemical vapor deposition.

17. The process as set forth in claim 8 wherein said inorganic protective coating is deposited on said photochromic pigment particle by precipitation of a soluble form of an inorganic coating onto said particle and subsequent treatment to form the oxide.

18. The process as set forth in claim 8 wherein the organic photochromic pigment that is formed is N-(3-pyridyl)-sydnone and a coating of silicon dioxide is deposited on said crystal.

* * * * *

UNITED STATES PATENT OFFICE
CERTIFICATE OF CORRECTION

PATENT NO. : 4,012,232
DATED : March 15, 1977
INVENTOR(S) : Donald R. Uhlmann; Elias Snitzer; Richard J. Hovey; Nori Y.C. Chu; and Joseph T. Fournier, Jr.

It is certified that error appears in the above-identified patent and that said Letters Patent are hereby corrected as shown below:

On the first page of the patent reading:

[73] Assignee: Nori Y.C. Chu, Southbridge, Mass.

should read:

[73] Assignee: American Optical Corp.
Southbridge, Mass.

Signed and Sealed this twelfth Day of July 1977

[SEAL]

Attest:

RUTH C. MASON
Attesting Officer

C. MARSHALL DANN
Commissioner of Patents and Trademarks